United States Patent
Lu et al.

(10) Patent No.: US 6,590,972 B1
(45) Date of Patent: Jul. 8, 2003

(54) DTMF DETECTION BASED ON LPC COEFFICIENTS

(75) Inventors: Youhong Lu, Vernon Hills, IL (US); Wenshun Tian, Rolling Meadows, IL (US)

(73) Assignee: 3Com Corporation, Santa Clara, CA (US)

( * ) Notice: Subject to any disclaimer, the term of this patent is extended or adjusted under 35 U.S.C. 154(b) by 79 days.

(21) Appl. No.: 09/809,559

(22) Filed: Mar. 15, 2001

(51) Int. Cl.$^7$ .............................. H04M 1/00; H04M 3/00
(52) U.S. Cl. ...................... 379/283; 379/286; 704/205; 704/219; 704/220; 704/262
(58) Field of Search ................................ 379/130, 242, 379/245, 251, 257, 282, 283, 286, 351, 386, 359, 361; 704/205, 219, 220, 262

(56) References Cited

U.S. PATENT DOCUMENTS

| | | | | |
|---|---|---|---|---|
| 4,689,760 A | * | 8/1987 | Lee et al. | 370/110.3 |
| 5,765,125 A | * | 6/1998 | Daugherty et al. | 704/205 |
| 5,787,390 A | * | 7/1998 | Quinquis et al. | 704/219 |

* cited by examiner

Primary Examiner—Binh Tieu
(74) Attorney, Agent, or Firm—McDonnell Boehnen Hulbert & Berghoff (57) ABSTRACT

A system and method for DTMF tone detection receives an input signal. The input signal includes a DTMF tone. The DTMF tone has a first frequency and a second frequency. An initial first frequency and an initial second frequency of said DTMF tone are selected by calculating a plurality of cost functions. The initial first frequency is confirmed to be the first frequency and the initial second frequency is confirmed to be the second frequency using re-computed values of the plurality of cost functions.

17 Claims, 5 Drawing Sheets

DTMF DETECTION BASED ON LPC COEFFICIENTS

FIELD OF THE INVENTION

This present invention relates to methods and devices that detect DTMF tones. In particular, the invention relates to using cost functions to detect DTMF tones.

BACKGROUND OF THE INVENTION

Dual Tone Multi-Frequency (DTMF) detectors have become widely used in the telecommunication industry. DTMF signals include two tones, one from a row group of frequencies and one from a column group of other frequencies. A pair of frequencies (one from the row and one from the column) determine a symbol. In one illustrative example, four frequencies may be selected for the row group and four frequencies may be selected for the column group. Sixteen pairs can be created from this grouping and can represent sixteen symbols, for instance, 1, 2, 3, 4, 5, 6, 7, 8, 9, 0, a, b, c, d, *, and #. The row frequencies may be 697 Hz, 770 Hz, 852 Hz, and 941 Hz. The column frequencies may be 1209 Hz, 1336 Hz, 1477 Hz, and 1633 Hz.

Devices in modern telecommunication systems may use several different methods to detect DTMF tones. For example, one technique uses discrete Fourier transforms (DTFs) to detect DTMF tones. Specifically, the DTF values at only the tone frequencies are computed as specified in a modified Goertzel algorithm. Although this technique may detect the DTMF tones, it has certain limitations. For instance, the technique depends upon the use of finely tuned thresholds and, therefore, may have variations depending upon different operating environments.

SUMMARY OF THE INVENTION

The system and method of the present invention advantageously allows DTMF tones to be determined by using the values of cost functions. Specifically, an initial determination of the two frequencies of a DTMF tone is made using the values of cost functions. The initial determination of the frequencies is confirmed by re-computing the values of the cost functions using an adjustment factor.

In one embodiment of the present invention, a system for determining DTMF tones includes a linear predictive coding (LPC) analysis module, a cost function generation module, a predetermination module, and an enhancement module.

The LPC analysis module receives an input signal. The input signal includes a DTMF tone. The DTMF tone has a first frequency and a second frequency. Using the input signal, the LPC analysis module computes LPC coefficients using the input signal. The LPC analysis signal may use an equation to model the spectrum of the input signal. The order of this equation can take on any value, for example, 10.

The cost-function generation module is coupled to the LPC analysis module and computes cost functions based, at least in part, upon said LPC coefficients determined by the LPC analysis module.

The predetermination module is coupled to the cost function analysis module and the LPC analysis module. The predetermination module determines an initial first frequency and an initial second frequency by using the cost functions. For example, the predetermination module may compute the values of the cost functions at a plurality of frequencies.

The enhancement module is coupled to the predetermination module and the cost-function analysis module. The enhancement module confirms that the initial first frequency is the first frequency and the initial second frequency is the second frequency based upon re-computing the values cost functions. The cost-functions may be re-computed for a plurality of frequencies and may take into account at least one adjustment factor.

These as well as other features and advantages of the present invention will become apparent to those of ordinary skill in the art by reading the following detailed description, with appropriate reference to the accompanying drawings.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1:
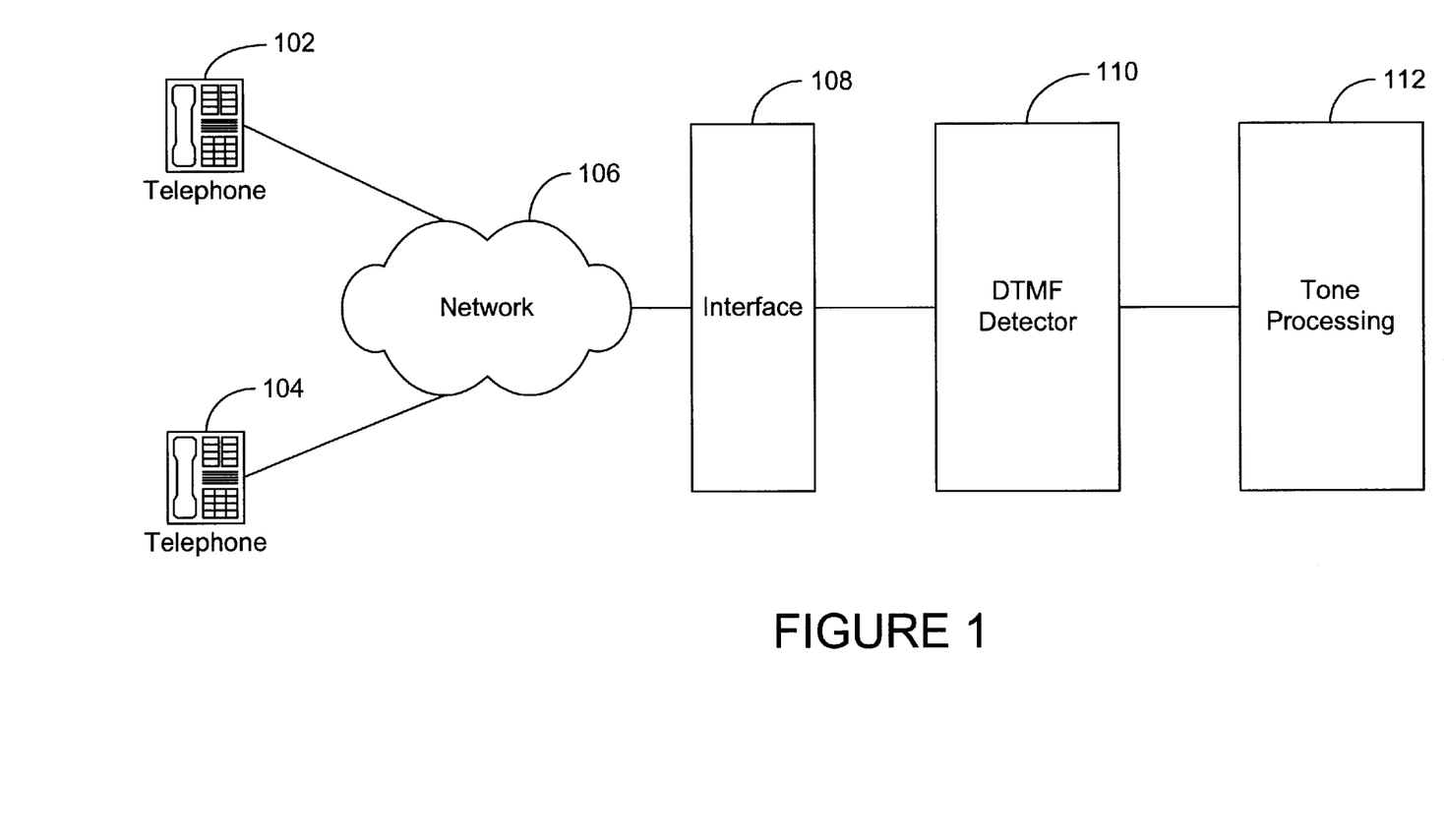
FIG. 1 is a diagram illustrating a preferred embodiment of a system in accordance with a preferred embodiment of the invention.

Referring now to FIG. 1, user devices 102 and 104 are coupled to a network 106. The network 106 is coupled to an interface 108. The interface 108 is coupled to a DTMF detector 110. The DTMF detector is coupled to a tone processing module 112. The user devices 102 and 104 may be any type of device that is used to transmit any type of information including DTMF tones. For example, the user devices 102 and 104 may be conventional telephones. However, other examples of user devices are possible.

The network 106 may be any type of network that is used to transmit any type of information. For example, the network may be the Public Switched Telephone Network (PSTN). The network 106 may also be a combination of networks, for instance, a wireless and landline network. The network 106 may contain all the functionality needed to route information from a source to a destination including, for example, switches and routers.

The interface 108 may be any type of device used to perform any conversion processes that are needed between the network 106 and the DTMF detector 110. For example, the interface 108 may convert analog signals received from the network 106 into digital signals for processing by the DTMF detector 110. Other types of conversion processes or no conversion process are also possible.

The DTMF detector 110 may receive signals from the interface 108 and may determine the DTMF tones in the signals using the method and system described in this specification. The DTMF detector 110 may send the DTMF tone, which the DTMF detector may determine, to the tone processing module 112.

The tone processing module 112 may be any type of signal processing system, for example, the tone processing module 112 may be a voice messaging system, a system for switching voice messages, or any system that requires the detection of tone signals. Other types of processing systems are possible.

In operation, the user devices 102 and 104 may generate signals, which include DTMF tones. For example, if the user devices 102 and 104 are telephones, DTMF tones may be generated when the user presses a key on the keypad of the telephone. The DTMF tones are passed via the network 106 to the interface 108. The interface 108 performs any conversions that are needed. For example, if the DTMF tones are in an analog form, the interface 108 may convert the signals into a digital format. The DTMF detector module 110 may then determine the tone using the algorithm described in this specification. Upon detection of the tone, the information concerning the tone is sent to the tone processing module 112. The tone processing module 112 may use this information to perform messaging functions. For example, messaging functions may include remote access of voicemail. Other examples are also possible.

Figure 2:
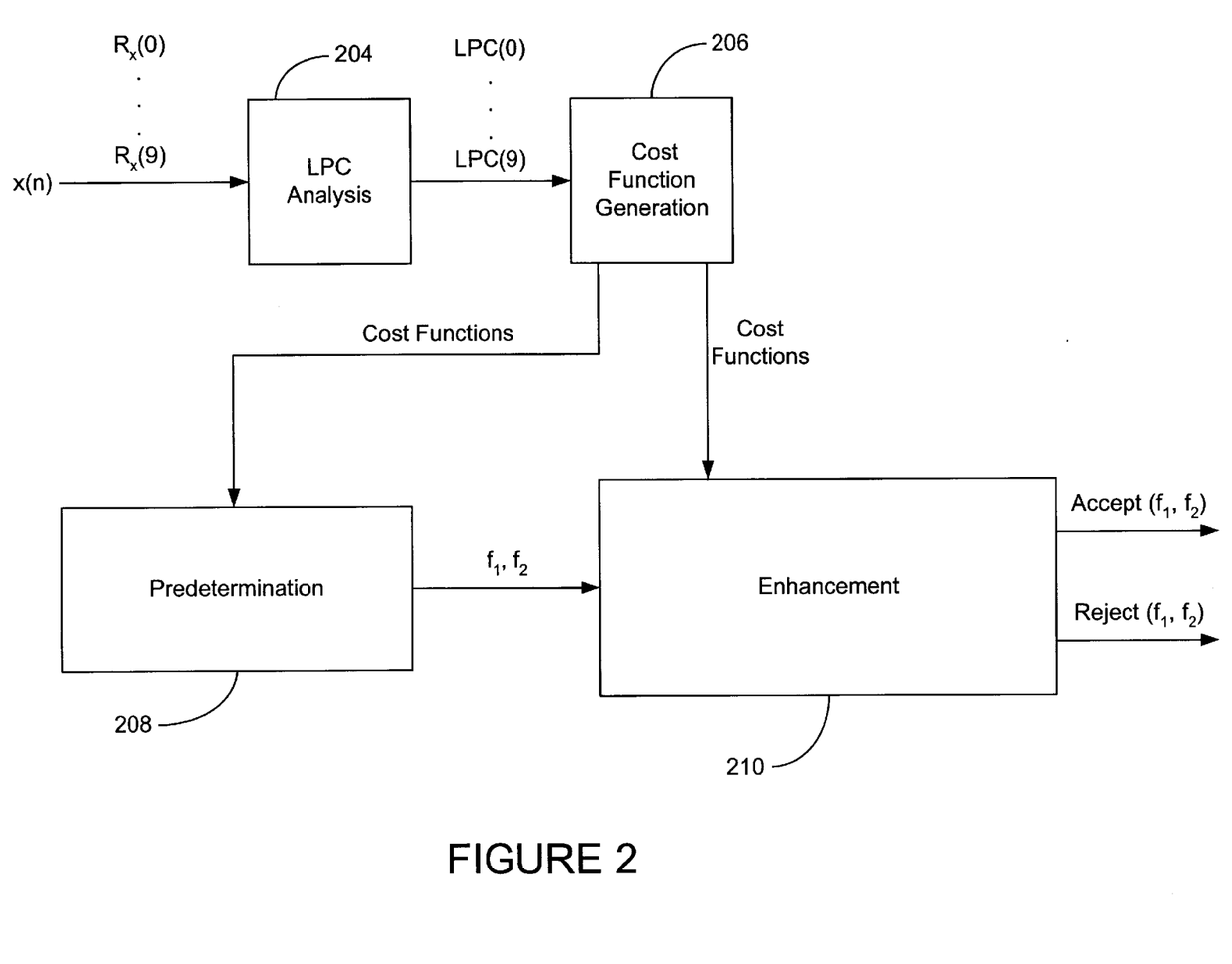
FIG. 2 is a diagram illustrating a DTMF detector in accordance with a preferred embodiment of the present invention.

Referring now to FIG. 2, a DTMF detector includes a linear predictive coding (LPC) calculation module 204, a cost function generation module 206, a predetermination module 208, and an enhancement module 210. The LPC analysis module 204 is coupled to the cost function generation module 206. The cost function generation module 206 is coupled to the predetermination module 208 and the enhancement module 210.

The LPC analysis module 204 generates LPC coefficients, which model the spectrum of the input signal. If x(n) is the input signal, then the LPC analysis module 204 may predict the sample using previous samples. If $\hat{x}(n)$ be the predicted value of x(n), then the prediction equation may be:

$$\hat{x}(n) = \sum_{k=1}^{L} a_k x(n-k) \quad (1)$$

The coefficient $a_k$ is the prediction coefficients and L is the prediction order. For speech signals, L may be set to any convenient value, for example, 10. However, other values of the prediction order are possible.

In one example, if the input signal is a DTMF signal such that $$x(n) = A^* \sin(2^* \pi^* f_1/f_s) + B^* \sin(2^* \pi^* f_2/f_s) \quad (2)$$

where A and B are constant, $f_1$ is one of {697, 770, 852, 941 Hz}, $f_2$ is one of {1209, 1336, 1477, 1633 Hz}, and $f_1$ is the sampling frequency.

The LPC coefficients may be given by:

$$a_1 = 2^*[\cos(2^*\pi^*f_1/f_s) + \cos(2^*\pi^*f_2/f_s)] \quad (3)$$

$$a_2 = -2^*[1 + 2^*\cos(2^*\pi^*f_1/f_s) + \cos(2^*\pi^*f_2/f_s)] \quad (4)$$

$$a_3 = a_1 \quad (5)$$

$$a_4 = -1 \quad (6)$$

and $a_k = 0$ for k=5 to L.

Using the LPC coefficients, the original signal spectrum S(z) envelop can be computed based on $$S(z) = 1 - a_1 z^{-1} - a_2 z^{-2} \ldots - a_L z^{-L} \quad (7)$$

Where $z = \exp(jw)$ with $w = 2\pi f/f_s$.

When we use equations (3), (4), (5), and (6), S(z) can be rewritten as:

$$S(z) = [1 - 2^*\cos(2^*\pi^*f_1/f_s)z^{-1} + z^{-2}][1 - 2^*\cos(2^*\pi^*f_2/f_s) + z^{-2}] \quad (8)$$

Two components related to the two dual frequencies. If a signal contains other components in addition to two dual frequency components, The spectral envelop will contain the other components in addition to the two components in equation (8). This is the base for our invention.

The LPC coefficients may be computed based on current small block of samples, for example, using the Levinson-Durbin algorithm. The algorithm first computes auto-correlation coefficients. The auto-correlation coefficients may be computed using any method, for example, if x(n) be the current block of samples with n=0, 1, ..., N−1, then this block of samples can be weighted by a window w(n) (for example, a hamming window), such that:

$$x'(n) = x(n)^* w(n) \quad (9)$$

Then, auto-correlation coefficients can be computed according to $$r(k) = \Sigma x'(n) x'(n-k) \quad (10)$$

The LPC analysis module 204 may then solve the following equation:

$$\begin{bmatrix} r(0) & r(1) & r(2) & \cdots & r(L) \\ r(1) & r(0) & r(1) & \cdots & r(L-1) \\ \cdots & & & & \\ r(L) & r(L-1) & r(L-2) & \cdots & r(0) \end{bmatrix} \begin{bmatrix} a_1 \\ a_2 \\ \cdots \\ a_L \end{bmatrix} = \begin{bmatrix} r(1) \\ r(2) \\ \cdots \\ r(L+1) \end{bmatrix} \quad (11)$$

Where r(k) are auto-correlation coefficients and are computed based on current block of samples. If DTMF detection is used in a system where there is a speech coding algorithm based on analysis by synthesis principal, then above LPC analysis module 204 can be saved since it is a part of the speech coding algorithm.

The cost function generation module 206 determines a set of cost functions. It receives as inputs the LPC coefficients determined by the LPC analysis module 304.

For example, if $\{a_k | k=1, \ldots L\}$ are LPC coefficients, a cost function may be given by:

$$C(f) = (a_{L-1} - c' + 2c'' \cos(2\pi f/fs))^2 + (a_L - c'')^2 \quad (12)$$

Where c'=y(L−3), c''=y(L−2), and y(n) is may be computed by $$y(n) - 2\cos(2\pi f/fs) y(n-1) + y(n-2) = a_n \quad (13)$$

with $$y(0) = a_1 - 2\cos(2\pi f/fs) \quad (14)$$

$$y(1) = a_2 - 2\cos(2\pi f/fs) y(0) + 1 \quad (15)$$

Where =f is one of {697, 770, 852, 941 Hz} in row frequency group and is one of {1209, 1336, 1477, 1633 Hz} in column frequency group. From (12), (13), (14), and (15), L multiplication operations may be required. If LPC coefficients are as in (3), (4), (5), and (6), the cost C is zero. Cosine values may be pre-computed and stored in a memory.

The predetermination module 208 may receive the cost functions from the cost function generation module 206 and make an initial determination concerning the identity of the DTMF frequencies.

For example, the costs for each frequency are calculated using equation (12). Specifically, the costs $C_{697}$ for frequency=697 Hz, $C_{770}$ for frequency=770 Hz, $C_{852}$ for frequency=852 Hz, and $C_{941}$ for frequency=941 Hz may be determined. If T1 is a threshold, for instance, 0.25, then the predetermination module 208 may determine a frequency f1 from the low frequency group (i.e., the row frequency group) 697, 770, 852, 941 Hz such that $C_{f1}$<minimum of the remaining three costs by the threshold $T1$ (16)

In one example, if $C_{697}=0.05$, $C_{770}=0.008$, $C_{852}=0.063$, and $C_{941}=0.099$, then $C_{770}<T1*\{C_{697}, C_{852}, C_{941}\}$, where $T1=0.25$. Therefore, a frequency of 770 Hz is chosen for f1 from the low frequency group.

Similarly, using equation (12), the costs $C_{1209}$ for f=1209, $C_{1336}$ for f=1336, $C_{1477}$ for f=1477, and $C_{1633}$ for f=1633 may be computed. If T2 is a threshold, for instance 0.11, then the predetermination module 208 determines a frequency f2 from the high frequency group(i.e., the column frequency group) 1209, 1336, 1477, 1633 such that:

$C_{f2}$<minimum of the remaining three costs by the threshold $T2$ (17)

If equation (16) or equation (17) are not satisfied, then it is determined that there is no DTMF symbol.

The enhancement module 210 receives the two frequencies generated in the predetermination step, and verifies the decision made by the predetermination module 208 using the cost functions generated by the cost function generation module 206.

For the frequencies f1 and f2, the enhancement module 210 may compute two parameters:

$$\Delta f1 = 0.015 * f1/3 \quad (18)$$

and $$\Delta f2 = 0.015 * f2/3 \quad (19)$$

Then, the enhancement module 210 may computes $C_{f1-3\Delta f1}$, $C_{f1-2\Delta f1}$, $C_{f1-\Delta f1}$, $C_{f1+\Delta f1}$, $C_{f1+2\Delta f1}$, $C_{f1+3\Delta f1}$ based on equation (12), where f is f1−3Δf1, f1−2Δf1, f1−Δf1, f1+Δf1, f1+2Δf1, f1+3Δf1, respectively. Then, the enhancement module 210 may find the minimum C1 from $\{C_{f1}, C_{f1-3\Delta f1}, C_{f1-2\Delta f1}, C_{f1-\Delta f1}, C_{f1+\Delta f1}, C_{f1+2\Delta f1}, C_{f1+3\Delta f1}\}$. If T3 is a threshold, for instance, 0.05, then the enhancement module 210 may determine whether:

C1<$T3$ *the remaining minimum costs in equation (16) (20)

Similarly, the enhancement module 210 may compute $C_{f2-3\Delta f2}$, $C_{f2-2\Delta f2}$, $C_{f2-\Delta f2}$, $C_{f2+\Delta f2}$, $C_{f2+2\Delta f2}$, $C_{f2+3\Delta f2}$, based on equation (12), where f is f2−3Δf2, f2−2Δf2, f2−Δf2, f2+Δf2, f2+2Δf2, f2+3Δf2, respectively. Then, the enhancement module may determine the minimum C2 from $\{C_{f2}, C_{f2-3\Delta f2}, C_{f2-2\Delta f2}, C_{f2-\Delta f2}, C_{f2+\Delta f2}, C_{f2+2\Delta f2}, C_{f2+3\Delta f2}\}$. If T4 is a threshold, for instance, 0.01, then the enhancement module 210 may determine if:

C2<T4*the remaining minimum costs in equation (17) (21)

If equation (20) or equation (21) are not satisfied, then it is determined that the input block does not contain a valid symbol. The reject line indicates that the initial determination has been rejected for the frequencies f1 and f2.

On the other hand, if both equation (20) and equation (21) are satisfied, then there is a valid symbol in the input block and the result is indicated on the accept line. Further processing may also occur. For example, if a symbol is determined to be valid in continuous two adjacent blocks, the symbol may be registered as the valid symbol. For the detection of next symbol, at least one invalid symbol block may be detected first, which may be correspond to pause.

Figure 3:
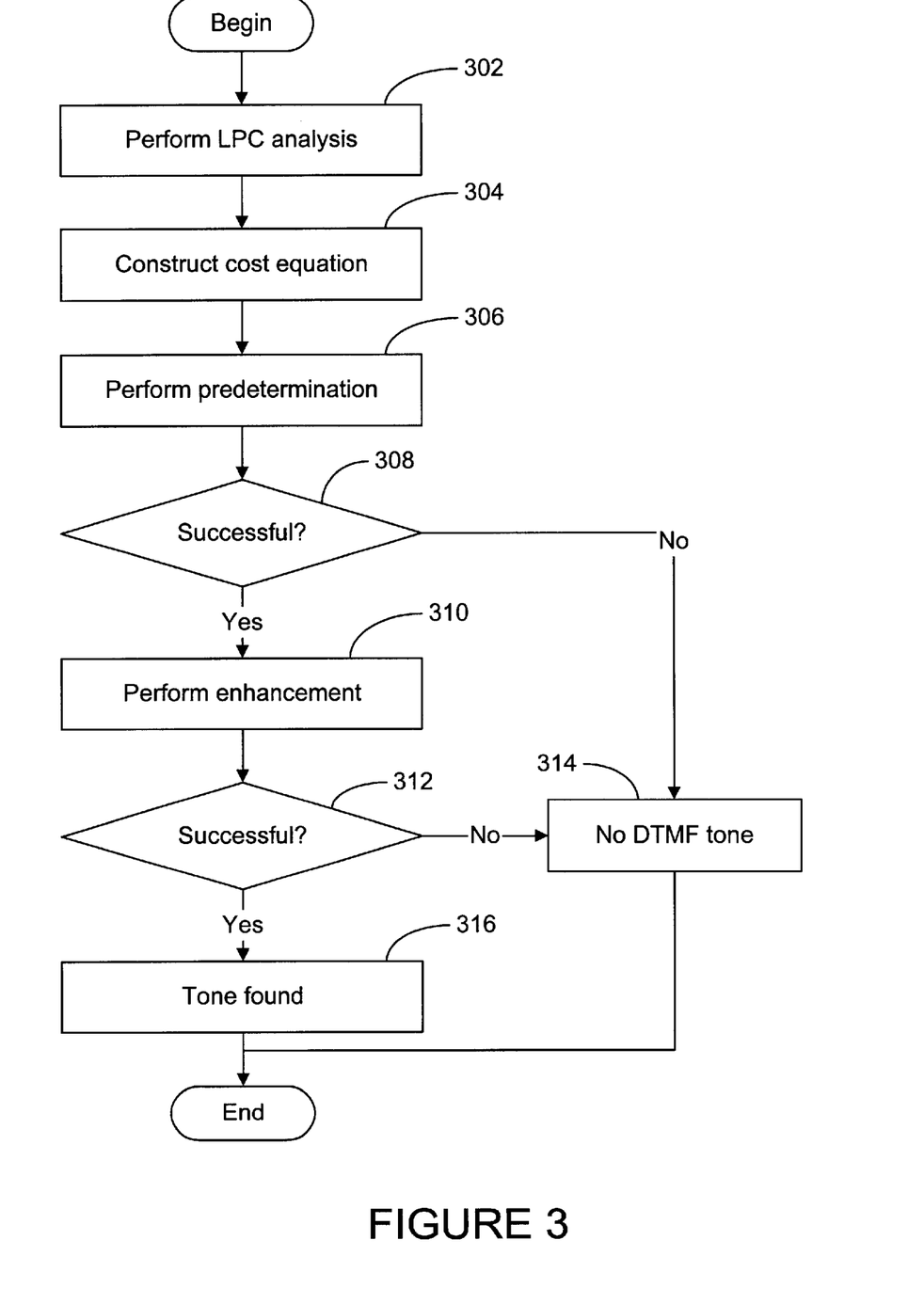
FIG. 3 shows a flowchart illustrating the operation of a DTMF detector in accordance with a preferred embodiment of the present invention.

Referring now to FIG. 3, one example of the operation of the system of the present invention is described. At step 302, LPC analysis is performed. For example, the LPC coefficients may be obtained by using the Levinson-Durbin algorithm. At step 304, a cost equation, $C_f$ is constructed using the LPC coefficients. The cost function $C_f$ may be determined by using equations (12) through (15), for instance.

At step 306, the predetermination step is performed. In one example of the predetermination step, the cost functions are computed for the frequencies of 697, 770, 852, and 941 Hz. Equations (12) through (15) may be used with the frequencies of 697, 770, 852, and 941 Hz. Similarly, equations (12) through (15) may be used to determine costs for frequencies of 1209, 1336, 1477, and 1633 Hz.

At step 308, it is determined whether a pair of frequencies has been successfully identified. For example, a minimum $C_{f1}$ may be found and a determination made as to whether this $C_{f1}$ is lower than the remaining costs by a first threshold for the frequencies of 697, 770, 852, and 941 Hz. Similarly, a minimum $C_{f2}$ may be found and a determination made as to whether this $C_{f2}$ is lower than the remaining costs for the frequencies of 1209, 1336, 1477, and 1633 Hz by a second threshold. If both of these conditions are satisfied, the predetermination step is deemed successful, and control continues at step 310. If the answer at step 308 is negative, then control continues at step 314 where the system determines that no DTMF tone has been detected. Execution then ends.

At step 310, an enhancement step is performed. For example, Δf1 and Δf2 may be computed using equations (18) and (19). Then, the costs $C_{f1-3\Delta f1}$, $C_{f1-2\Delta f1}$, $C_{f1-\Delta f1}$, $C_{f1+\Delta f1}$, $C_{f1+2\Delta f1}$, $C_{f1+3\Delta f1}$ may be computed based on equation (12), where f is f1−3Δf1, f1−2Δf1, f1−Δf1, f1+Δf1, f1+2Δf1, f1+3Δf1, respectively. Then, the minimum value, C1, from $\{C_{f1}, C_{f1-3\Delta f1}, C_{f1-2\Delta f1}, C_{f1-\Delta f1}, C_{f1+\Delta f1}, C_{f1+2\Delta f1}, C_{f1+3\Delta f1}\}$ may be determined. Similarly, the costs $C_{f2-3\Delta f2}$, $C_{f2-2\Delta f2}$, $C_{f2-\Delta f2}$, $C_{f2+\Delta f2}$, $C_{f2+2\Delta f2}$, $C_{f2+3\Delta f2}$ based on equation (12), where f is f2−3Δf2, f2−2Δf2, f2−Δf2, f2+Δf2, f2+2Δf2, f2+3Δf2, respectively. Then, the minimum C2 may be determined from $\{C_{f2}, C_{f2-3\Delta f2}, C_{f2-2\Delta f2}, C_{f2-\Delta f2}, C_{f2+\Delta f2}, C_{f2+2\Delta f2}, C_{f2+3\Delta f2}\}$.

At step 312, it is determined whether C1<the remaining costs determined in step 306 (relating to the frequencies of 697, 770, 852, and 941 Hz) by a threshold. It is also determined whether C2<T4 the remaining costs determined in step 306 (relating to the frequencies of 1209, 1336, 1477, and 1633 Hz) by a threshold. If both conditions are met, execution continues at step 316 where the system determines that the tone has been found with frequencies of f1 and f2. If the answer at step 312 is negative, then execution continues at step 314 as described above.

Figure 4A:
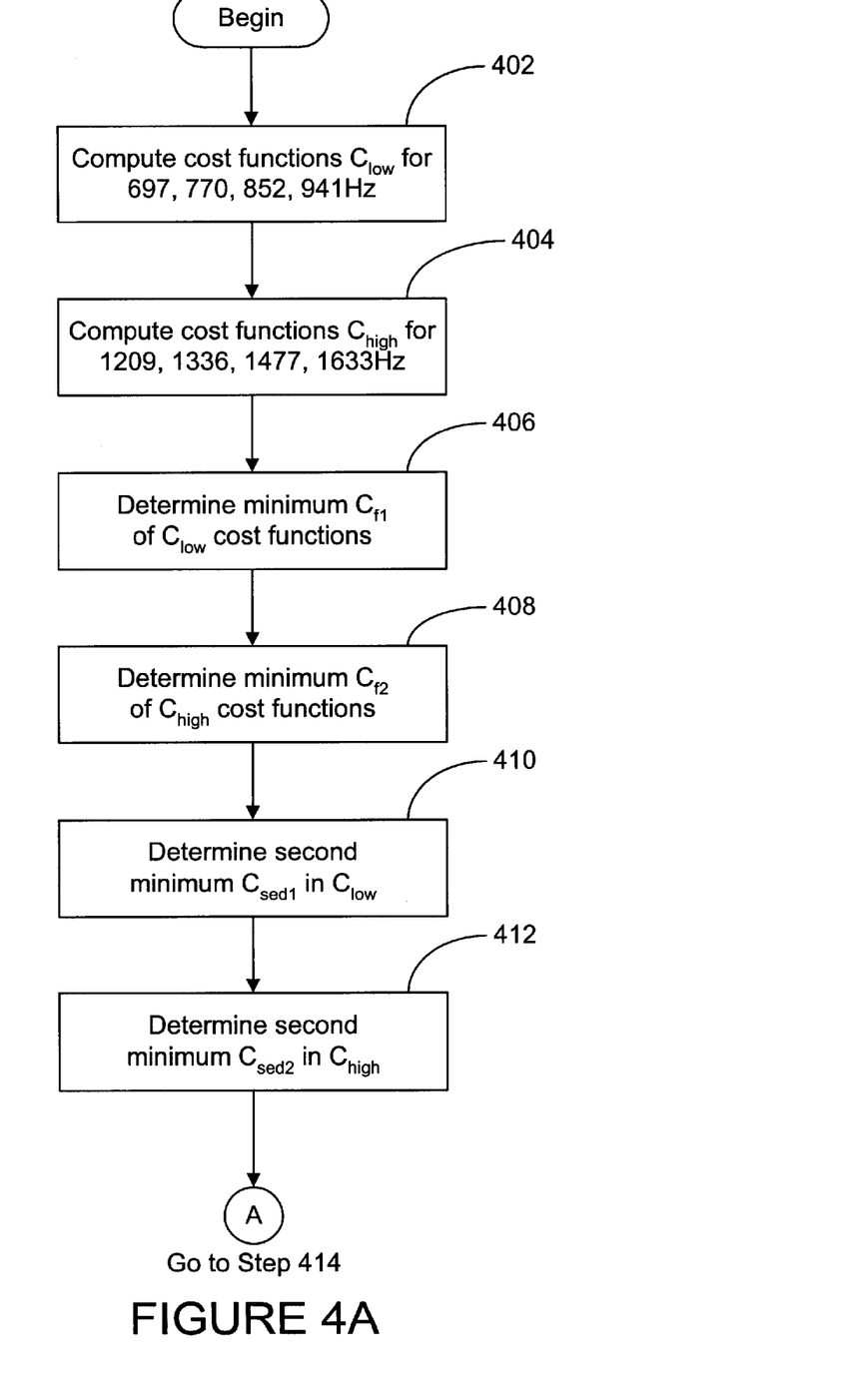
FIG. 4 shows a flowchart illustrating the operation of a DTMF detector in accordance with a preferred embodiment of the present invention.
Figure 4B:
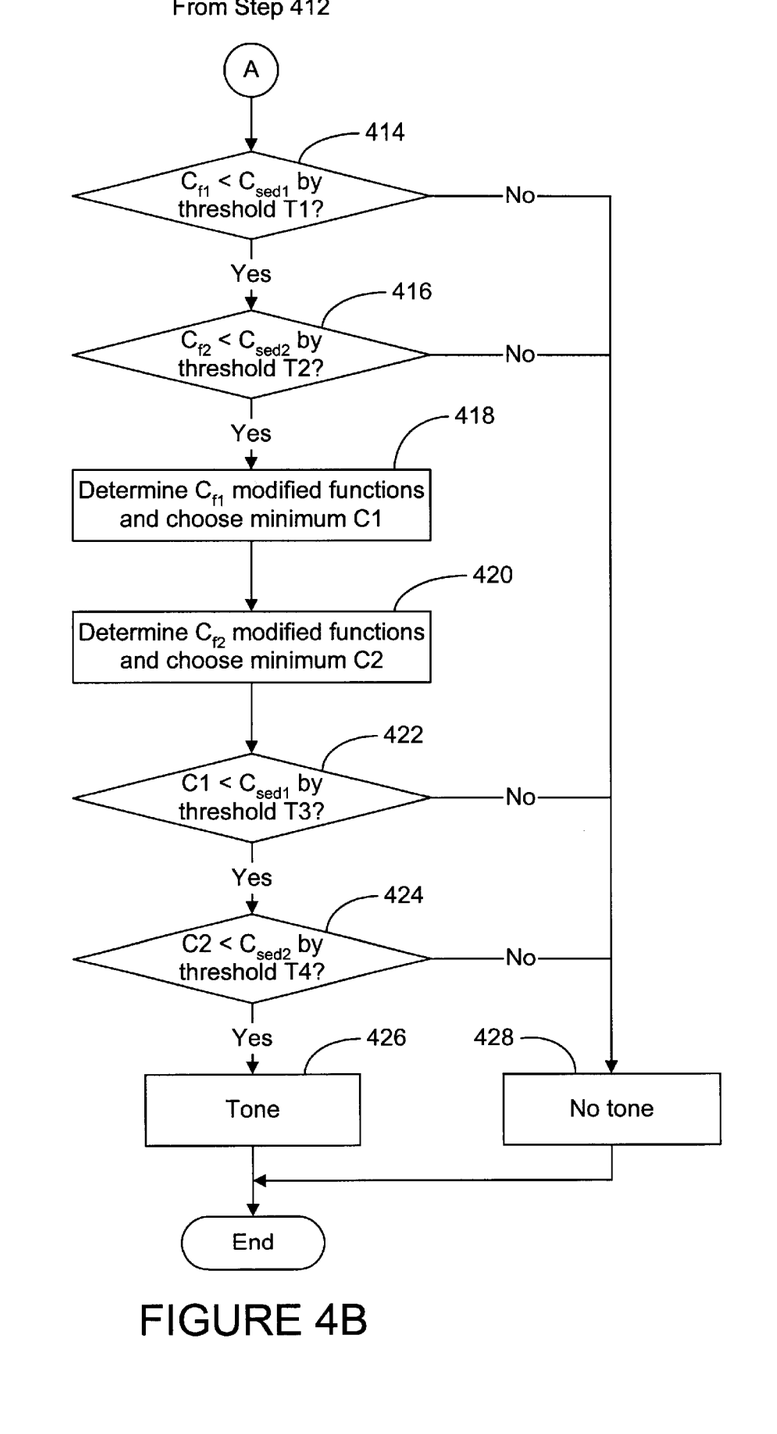

Referring now to FIG. 4, the predetermination and enhancement steps are described. At step 402, the cost functions $C_{low}$ for the frequencies of 697, 770, 852, and 941 Hz are computed. For instance, equations (12) through (15) may be used with the frequencies of 697, 770, 852, and 941 Hz. At step 404, the cost functions $C_{high}$ may be calculated for the frequencies of 1209, 1336, 1477, and 1633 Hz. For example, equations (12) through (15) may be used to determine costs for frequencies of 1209, 1336, 1477, and 1633 Hz.

At step 406, a minimum $C_{f1}$ may be found from the $C_{low}$ cost functions. At step 408, a minimum $C_{f2}$ may be found from the $C_{high}$ cost functions. At step 410, a second lowest cost from the $C_{low}$ group ($C_{sed1}$) is determined. At step 412, the second lowest cost from the $C_{high}$ group ($C_{sed2}$) is determined.

At step 414, it is determined whether $C_{f1}$ is less than $C_{sed1}$ by a first threshold. If the answer at step 414 is negative, then control continues at step 428 where the system determines that it cannot determine a tone. A valid symbol flag S_flag may be set to zero and execution then ends.

If the answer at step 414 is affirmative, then at step 416, it is determined whether $C_{f2}$ is less than $C_{sed2}$ by a second threshold. If the answer at step 414 is negative, then execution continues at step 428 as described above. If the answer at step 414 is affirmative, then execution continues at step 418.

At step 418, the cost functions for the row frequencies are recalculated with an adjustment factor and a minimum cost function C1 determined from this group. For example, the adjustment factor $\Delta f1$ may be computed using equation (18). Then, the costs from $C_{f1-3\Delta f1}$, $C_{f1-2\Delta f1}$, $C_{f1-\Delta f1}$, $C_{f1+\Delta f1}$, $C_{f1+2\Delta f1}$, $C_{f1+3\Delta f1}$ may be computed based on equation (12), where f is f1−3Δf1, f1−2Δf1, f1−Δf1, f1+Δf1, f1+2Δf1, f1+3Δf1, respectively. Then, the minimum value, C1, from $\{C_{f1}, C_{f1-3\Delta f1}, C_{f1-2\Delta f1}, C_{f1-\Delta f1}, C_{f1+\Delta f1}, C_{f1+2\Delta f1}, C_{f1+3\Delta f1}\}$ may be determined.

At step 420, the cost functions for the column frequencies are recalculated with an adjustment factor and a minimum cost function C2 determined from this group. For example, the adjustment factor $\Delta f2$ may be computed using equations (18). The costs $C_{f2-3\Delta f2}$, $C_{f2-2\Delta f2}$, $C_{f2-\Delta f2}$, $C_{f2+\Delta f2}$, $C_{f2+2\Delta f2}$, $C_{f2+3\Delta f2}$ may be computed based on equation (12), where f is f2−3Δf2, f2−2Δf2, f2−Δf2, f2+Δf2, f2+2Δf2, f2+3Δf2, respectively. Then, the minimum C2 may be determined from $\{C_{f2}, C_{f2-3\Delta f2}, C_{f2-2\Delta f2}, C_{f2-\Delta f2}, C_{f2+\Delta f2}, C_{f2+2\Delta f2}, C_{f2+3\Delta f2}\}$.

At step 422, it is determined whether C1 is less than $C_{sed1}$ by a third threshold, T3. If the answer at step 422 is negative, then execution continues at step 428 as described above. If the answer at step 422 is affirmative, then execution continues at step 424.

At step 424, it is determined whether C2 is less than $C_{sed2}$ by a fourth threshold. If the answer is negative, then execution continues at step 428 as described above. If the answer at step 424 is affirmative, then execution continues at step 426. At step 426, the frequencies f1 and f2 are selected as the frequencies for the DTMF tone. At this stage, S_flag may be set to one, and a symbol is obtained via mapping between symbol and frequencies.

In one illustrative embodiment the first threshold T1 was set to 0.25 corresponding to 6 dB, the second threshold T2 to 0.11 corresponding to 9.6 dB, the third threshold T3 to 0.05 corresponding to 13 dB, and the fourth threshold T4 to 0.01 corresponding to 20 dB. These values maybe obtained from a computer simulation of the system of the present invention with different inputs.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for determining DTMF tones may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for determining DTMF tones, the system comprising:
   a linear predictive coding (LPC) analysis module, said LPC analysis module receiving an input signal, said input signal including a DTMF tone, said DTMF tone having a first frequency and a second frequency, said LPC analysis module computing LPC coefficients using said input signal;
   a cost-function generation module coupled to said LPC analysis module, said cost function generation module computing cost functions based at least in part upon said LPC coefficients;
   a predetermination module coupled to said cost function generation module, said predetermination module determining an initial first frequency and an initial second frequency by computing the values of said cost functions at a plurality of frequencies; and
   an enhancement module, said enhancement module being coupled to said predetermination module and said cost-function generation module, said enhancement module confirming that said initial first frequency is said first frequency and said initial second frequency is said second frequency based upon re-computing the values of said cost functions, said cost-functions being re-computed using said plurality of frequencies and using at least one adjustment factor.

2. The system of claim 1 wherein said first initial frequency is chosen from the group of frequencies 697, 770, 852, and 941 Hz and said second initial frequency is chosen from the group of frequencies 1209, 1336, 1477, and 1633 Hz.

3. The system of claim 1 wherein said LPC analysis module uses an equation of order 10.

4. The system of claim 1 wherein said at least one adjustment factor consists of a first adjustment factor relating to said first initial frequency and a second adjustments factor related to said second initial frequency.

5. A method comprising:
   receiving an input signal and determining a plurality of linear predictive coding (LPC) coefficients using said input signal;
   computing a first group of costs associated with a first group of frequencies and a second group of costs associated with a second group of frequencies;
   choosing an initial first frequency using said costs associated with said first group of frequencies and choosing a second initial frequency using, said costs associated with said second group of frequencies;
   computing a third group of costs associated with a third group of frequencies, said third group of frequencies differing from said first group of frequencies by an adjustment factor;

computing a fourth group of costs associated with a fourth group of frequencies, said fourth group of frequencies differing from said second group of frequencies by an adjustment factor; and confirming said first initial frequency is said first frequency using said third group of costs and confirming said second initial frequency is said second frequency using said fourth group of costs, wherein said first, second, third and fourth groups of costs are based, at least in part, on said LPC coefficients.

6. The method of claim 5 wherein said LPC coefficients are determined with an equation of order 10.

7. The method of claim 5 wherein said wherein said initial first frequency is chosen from the group of frequencies 697, 770, 852, and 941 Hz and said initial second frequency is chosen from the group of frequencies of 1209, 1336, 1477, and 1633 Hz.

8. A method of determining frequencies in a DTMF tone, said method comprising:

receiving an input signal, said input signal including a DTMF tone, said DTMF tone having a first frequency and a second frequency;

selecting an initial first frequency and an initial second frequency of said DTMF tone using a plurality of cost functions; and confirming said initial first frequency is said first frequency and said initial second frequency is said second frequency using re-computed values of said plurality of cost functions.

9. The method of claim 8 wherein said initial first frequency is chosen from the group of frequencies 697, 770, 852, and 941 Hz and said initial second frequency is chosen from the group of frequencies of 1209, 1336, 1477, and 1633 Hz.

10. The method of claim 8 wherein said input signal is received by a linear predictive coding (LPC) analysis module;

said LPC analysis module determines a plurality of LPC coefficients using an equation of order 10; and said LPC coefficients are used to compute said cost functions.

11. The method of claim 8 wherein said re-computed values are computed using at least a single adjustment factor.

12. A system of determining frequencies in a DTMF tone, said system comprising:

means for receiving an input signal, said input signal including a DTMF tone, said DTMF tone having a first frequency and a second frequency;

means for selecting an initial first frequency and an initial second frequency of said DTMF tone using a plurality of cost functions; and means for confirming said initial first frequency is said first frequency and said initial second frequency is said second frequency using re-computed values of said plurality of cost functions.

13. A computer program for determining a DTMF tone, said program comprising:

first code for receiving an input signal, said input signal including a DTMF tone, said DTMF tone having a first frequency and a second frequency;

second code for selecting an initial first frequency and an initial second frequency of said DTMF tone using a plurality of cost functions; and third code for confirming said initial first frequency is said first frequency and said initial second frequency is said second frequency using re-computed values of said plurality of cost functions.

14. A computer readable medium having stored therein instructions for causing a processing unit to execute the following method:

receiving an input signal, said input signal including a DTMF tone, said DTMF tone having a first frequency and a second frequency;

selecting an initial first frequency and an initial second frequency of said DTMF tone using a plurality of cost functions; and confirming said initial first frequency is said first frequency and said initial second frequency is said second frequency using re-computed values of said plurality of cost functions.

15. A system for determining a DTMF tone comprising:

means for receiving an input signal and determining a plurality of linear predictive coding (LPC) coefficients using said input signal;

means for computing a first group of costs associated with a first group of frequencies and a second group of costs associated with a second group of frequencies;

means for choosing an initial first frequency using said costs associated with said first group of frequencies and choosing a second initial frequency using said costs associated with said second group of frequencies;

means for computing a third group of costs associated with a third group of frequencies, said third group of frequencies differing from said first group of frequencies by an adjustment factor;

means for computing a fourth group of costs associated with a fourth group of frequencies, said fourth group of frequencies differing from said second group of frequencies by an adjustment factor; and means for confirming said first initial frequency is said first frequency using said third group of costs and confirming said second initial frequency is said second frequency using said fourth group of costs, wherein said first, second, third and fourth groups of costs are based, at least in part, on said LPC coefficients, wherein said first, second, third and fourth groups of costs are based, at least in part, on said LPC coefficients.

16. A computer program for determining a DTMF tone, said program comprising:

first code for receiving an input signal and determining a plurality of linear predictive coding (LPC) coefficients using said input signal;

second code for computing a first group of costs associated with a first group of frequencies and a second group of costs associated with a second group of frequencies;

third code for choosing an initial first frequency using said costs associated with said first group of frequencies and choosing a second initial frequency using said costs associated with said second group of frequencies;

fourth code for computing a third group of costs associated with a third group of frequencies, said third group of frequencies differing from said first group of frequencies by an adjustment factor;

fifth code for computing a fourth group of costs associated with a fourth group of frequencies, said fourth group of frequencies differing from said second group of frequencies by an adjustment factor; and sixth code for confirming said first initial frequency is said first frequency using said third group of costs and confirming said second initial frequency is said second frequency using said fourth group of costs, wherein said first, second, third and fourth groups of costs are based, at least in part, on said LPC coefficients.

17. A computer readable medium having stored therein instructions for causing a processing unit to execute the following method:

receiving an input signal and determining a plurality of LPC coefficients using said input signal;

computing a first group of costs associated with a first group of frequencies and a second group of costs associated with a second group of frequencies;

choosing an initial first frequency using said costs associated with said first group of frequencies and choosing a second initial frequency using said costs associated with said second group of frequencies;

computing a third group of costs associated with a third group of frequencies, said third group of frequencies differing from said first group of frequencies by an adjustment factor;

computing a fourth group of costs associated with a fourth group of frequencies, said fourth group of frequencies differing from said second group of frequencies by an adjustment factor; and confirming said first initial frequency is said first frequency using said third group of costs and confirming said second initial frequency is said second frequency using said fourth group of costs, wherein said first, second, third and fourth groups of costs are based, at least in part, on said LPC coefficients.

* * * * *